(12) United States Patent
Kumar et al.

(10) Patent No.: US 10,893,331 B1
(45) Date of Patent: Jan. 12, 2021

(54) SUBTITLE PROCESSING FOR DEVICES WITH LIMITED MEMORY

(71) Applicant: Amazon Technologies, Inc., Seattle, WA (US)

(72) Inventors: Avinash Kumar, Seattle, WA (US); Ravindra Ganti, Sammamish, WA (US); Yongjun Wu, Bellevue, WA (US); Lei Li, Kirkland, WA (US); Abhishek Kumar, Redmond, WA (US); Nicholas Lovejoy, Seattle, WA (US); Patrick Joseph Lewis, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 7 days.

(21) Appl. No.: 16/218,282

(22) Filed: Dec. 12, 2018

(51) Int. Cl.
| | |
|---|---|
| H04N 21/462 | (2011.01) |
| H04N 21/488 | (2011.01) |
| H04N 21/8547 | (2011.01) |
| H04N 21/258 | (2011.01) |
| H04N 21/81 | (2011.01) |
| H04N 21/658 | (2011.01) |

(52) U.S. Cl.
CPC ... *H04N 21/4621* (2013.01); *H04N 21/25833* (2013.01); *H04N 21/4884* (2013.01); *H04N 21/6582* (2013.01); *H04N 21/8126* (2013.01); *H04N 21/8547* (2013.01)

(58) Field of Classification Search
CPC ......... H04N 21/4621; H04N 21/25833; H04N 21/4884; H04N 21/6582; H04N 21/8126; H04N 21/8547
See application file for complete search history.

(56) References Cited

U.S. PATENT DOCUMENTS

| | | | |
|---|---|---|---|
| 2004/0125877 A1* | 7/2004 | Chang | G06K 9/00335 375/240.28 |
| 2012/0170906 A1* | 7/2012 | Soroushian | H04N 19/40 386/241 |
| 2014/0143218 A1* | 5/2014 | Sanghavi | G06F 16/48 707/695 |
| 2014/0351871 A1* | 11/2014 | Bomfim | H04N 21/23439 725/93 |
| 2015/0373420 A1* | 12/2015 | Liu | H04N 21/435 725/32 |
| 2016/0066055 A1* | 3/2016 | Nir | G10L 15/05 725/35 |
| 2018/0157657 A1* | 6/2018 | Li | G06K 9/00469 |

* cited by examiner

*Primary Examiner* — Chenea Davis
(74) *Attorney, Agent, or Firm* — Weaver Austin Villeneuve & Sampson LLP

(57) ABSTRACT

Methods and apparatus are described for reducing subtitle information for just-after-broadcast (JAB) content. Redundant information in subtitle entries is removed so that some client devices with limited memory can handle the single subtitle file that is delivered with JAB content.

22 Claims, 4 Drawing Sheets

SUBTITLE PROCESSING FOR DEVICES WITH LIMITED MEMORY

BACKGROUND

Much of the video content delivered by online content services includes subtitle information that may be displayed in conjunction with the video and audio components of the content at the option of the viewer. The manner in which the subtitle information is provided to the client device may depend on the nature of the video content and the way it is delivered. For example, streaming video services typically deliver subtitle information as a sequence of fragments that are successively requested by the client device using a manifest or playlist in a manner similar to the way in which the client device acquires the corresponding video and audio fragments. By contrast, video-on-demand (VOD) services may deliver subtitle information out-of-band as a single file that includes all of the subtitles for the entire presentation. For video content of longer durations, the size of such a subtitle file may present processing challenges for devices having limited memory resources.

DETAILED DESCRIPTION

This disclosure describes techniques for generating and/or delivering subtitle information for video content in ways that can be handled by client devices having limited memory. A particular class of implementations takes advantage of redundancies in the subtitle information associated with some video content to significantly reduce the amount of subtitle information. An example may be instructive.

Just-after-broadcast or JAB content is video content that is derived from a live or broadcast stream of video content (e.g., of a live event such as a sporting event or a concert) and made available at some time after the beginning of the event or shortly after the end of the event for delivery in a manner similar to video-on-demand (VOD) content. As part of the conversion of such a stream to JAB content, the subtitle information delivered with the broadcast stream is aggregated. The aggregated subtitle information may include redundant entries because of the way in which the subtitle text is typically generated during a live event.

That is, during a live event, a human captioner or an automated speech-to-text translator might generate the subtitle text by typing or generating the text in real time based on the audio portion of the broadcast content. As a result, a new subtitle entry might be generated for each new word as it appears, with successive entries including text from the previous entry plus the new word. This may be understood with reference to the example shown in FIG. 1 which depicts a transcription of the audio from a professional basketball game.

The depicted example shows seven consecutive entries in a subtitle file 102 that correspond to a duration of the content from time stamp 00:00:02.964 to time stamp 00:00:04.265. The consecutive entries reflect a captioner successively typing the words of the phrase "TUESDAY, LEADING HIS TEAM TO" which is shown on the screen along with a preceding subtitle line for the phrase "#30 EXPLODED FOR 40 POINTS ON." As becomes apparent when comparing the repeated information in successive entries, this results in a significant amount of redundant information. This, in turn, results in a very large subtitle file for presentations having long durations. For example, for a typical 3-hour sporting event, the resulting subtitle file might be on the order of 3 MB as compared to a typical file size of 300 to 500 kB for the subtitle file associated with a VOD presentation of similar duration.

Figure 1:
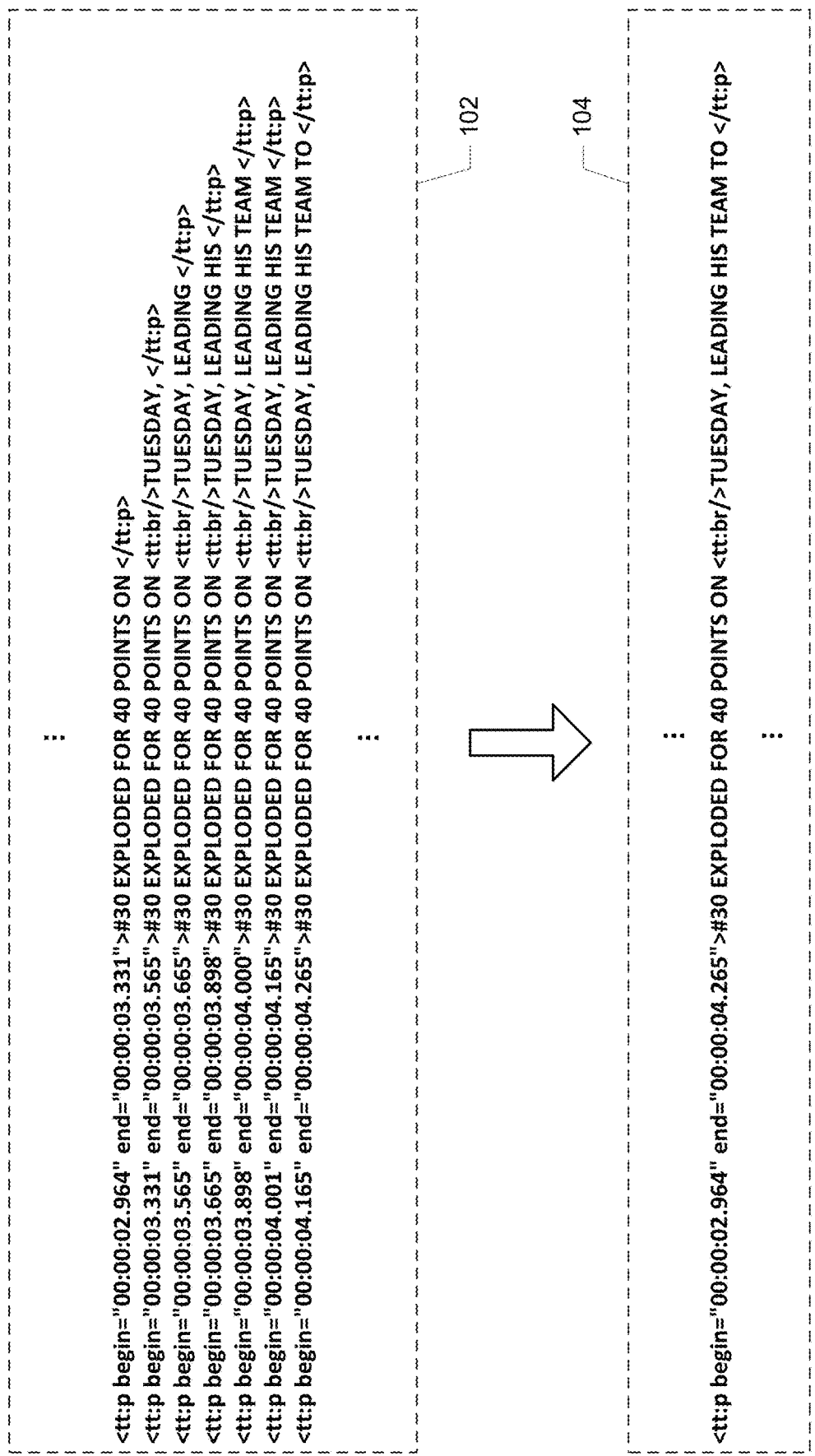
FIG. 1 illustrates an example of reduction of a subtitle information according to a particular class of implementations enabled by the present disclosure.

According to a particular class of implementations, the subtitle information generated for a broadcast video presentation is significantly reduced by removing redundant entries and modifying the time stamps associated with the remaining entries. In the example of FIG. 1, the seven original entries in file 102 may be represented by a single entry in reduced file 104 that includes the phrase "#30 EXPLODED FOR 40 POINTS ON TUESDAY, LEADING HIS TEAM TO." Moreover, the time range for the remaining entry may be specified to cover all or some portion of the entire duration between time stamp 00:00:02.964 and time stamp 00:00:04.265. That is, rather than progressively adding words to the screen over that time span, the entire phrase would appear for all or at least a portion of the time range associated with the original seven entries. As will be appreciated, significant file size reduction can be realized using this approach without the loss of subtitle information. And because the remaining entry is displayed as a static phrase similar to VOD subtitles, the subtitles for the VOD-style content may be less distracting and easier to read than the constantly changing subtitles typically associated with broadcast content depicting live events.

Figure 2:
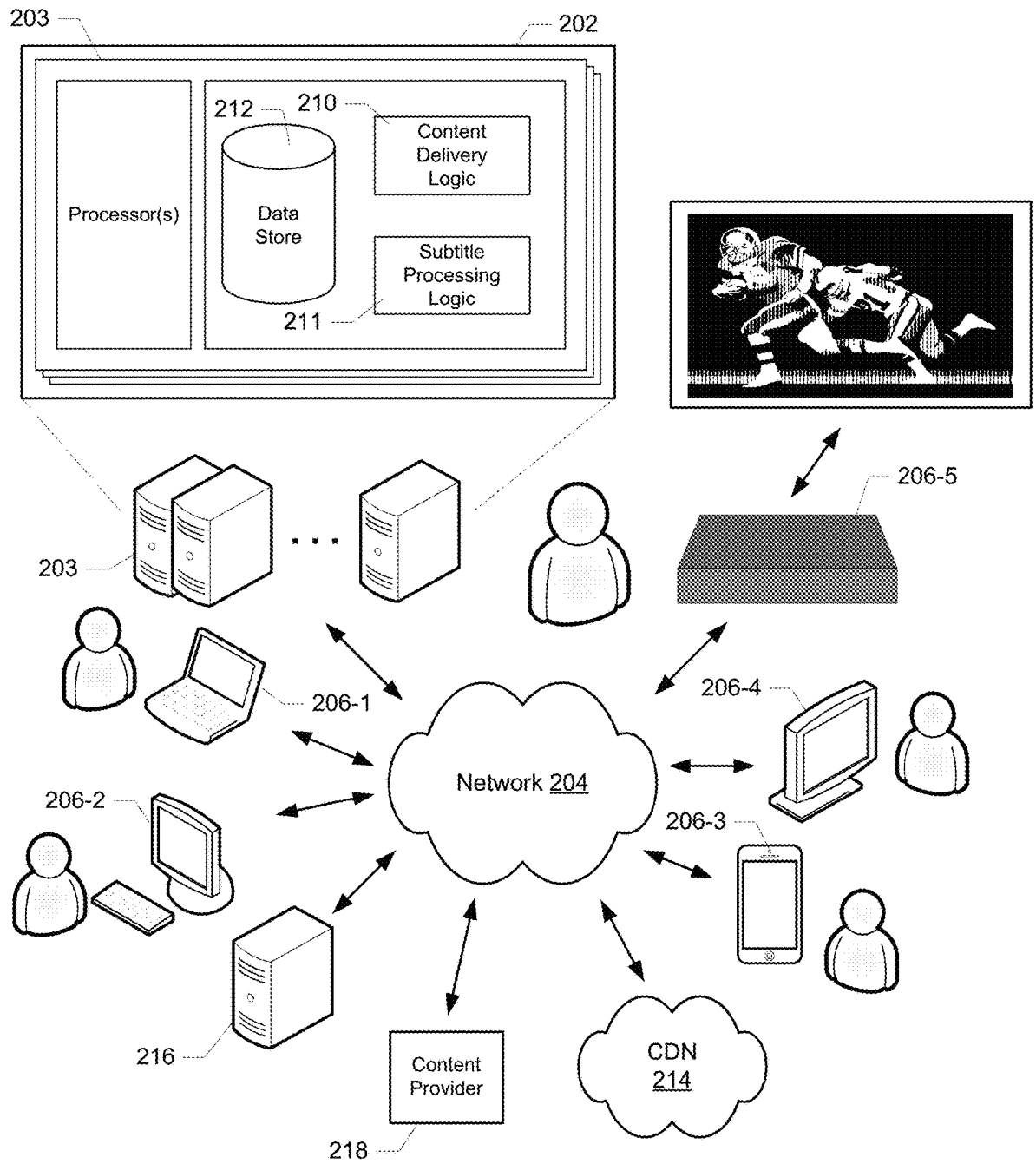
FIG. 2 illustrates an example of a computing environment in which implementations enabled by the present disclosure may be practiced.

FIG. 2 illustrates an example of a computing environment in which a video content service 202 provides video content via network 204 to a variety of client devices (206-1 through 206-5) in accordance with the techniques described herein. The video content may include live or broadcast content, VOD content, and/or VOD-style content such as, for example, JAB content. Content service 202 may conform to any of a wide variety of architectures such as, for example, a services platform deployed at one or more co-locations, each implemented with one or more servers 203. Network 204 represents any subset or combination of a wide variety of network environments including, for example, TCP/UDP over IP-based networks, unicast/multicast/broadcast networks, telecommunications networks, wireless networks, satellite networks, cable networks, public networks, private networks, wide area networks, local area networks, the Internet, the World Wide Web, intranets, extranets, and so on. Client devices 206 may be any suitable device capable of connecting to network 204 and consuming content provided by service 202. Such devices may include, for example, mobile devices (e.g., cell phones, smart phones, and tablets), personal computers (e.g., laptops and desktops), set top boxes (e.g., for cable, satellite, and online systems), smart televisions, digital assistant devices, gaming consoles, wearable computing devices (e.g., smart watches or smart glasses), etc.

At least some of the examples described herein contemplate implementations based on computing models that enable ubiquitous, convenient, on-demand network access to a shared pool of computing resources (e.g., networks, servers, storage, applications, and services). As will be understood, such computing resources may be integrated with and/or under the control of the same entity controlling content service 202. Alternatively, such resources may be independent of content service 202, e.g., on a platform under control of a separate provider of computing resources with which content service 202 connects to consume computing resources as needed.

It should also be noted that, despite any references to particular computing paradigms and software tools herein, the computer program instructions on which various implementations are based may correspond to any of a wide variety of programming languages, software tools and data formats, may be stored in any type of non-transitory computer-readable storage media or memory device(s), and may be executed according to a variety of computing models including, for example, a client/server model, a peer-to-peer model, on a stand-alone computing device, or according to a distributed computing model in which various functionalities may be effected or employed at different locations.

In the following examples and for the sake of simplicity, content service 202 is described as if it is integrated with the platform(s) that provides both broadcast content and VOD-style content to client devices. However, it will be understood that content service 202 may provide access to content in conjunction with one or more content delivery networks (e.g., CDN 214) that may or may not be independent of content service 202. In addition, the source(s) of one or both of the broadcast and VOD-style content may or may not be independent of content service 202 (e.g., as represented by content provider server 216, and live content provider 218). The range of variations known to those of skill in the art are contemplated to be within the scope of this disclosure.

Some of the implementations enabled by the present disclosure contemplate logic resident on the client devices consuming video content from content service 202; such logic might be configured to handle, for example, requesting smaller chunks of subtitle files. Such logic might be part of an existing algorithm or module on the client device or implemented to work in conjunction with such an algorithm or module.

It should also be noted that implementations are contemplated in which, in addition to content delivery logic 210 (which facilitates various aspects of content delivery to client devices 206), content service 202 may include other types of logic, e.g., subtitle processing logic 211 that facilitates reduction in the size of subtitle files and/or providing subtitle files in smaller chunks.

In addition to providing access to video content, content service 202 may also include a variety of information related to the video content (e.g., subtitle information, and other associated metadata and manifests in data store 212 to which service 202 provides access). Alternatively, such information associated with and/or about the content, as well as the content itself may be provided and/or hosted by one or more separate platforms, e.g., CDN 214. It should be noted that, while logic 210 and 211, and data store 212 are shown as integrated with content service 202, implementations are contemplated in which some or all of these operate remotely from the associated content service, and/or are under the control of an independent entity. From these examples, those of skill in the art will understand the diversity of use cases to which the techniques described herein are applicable.

Figure 3:
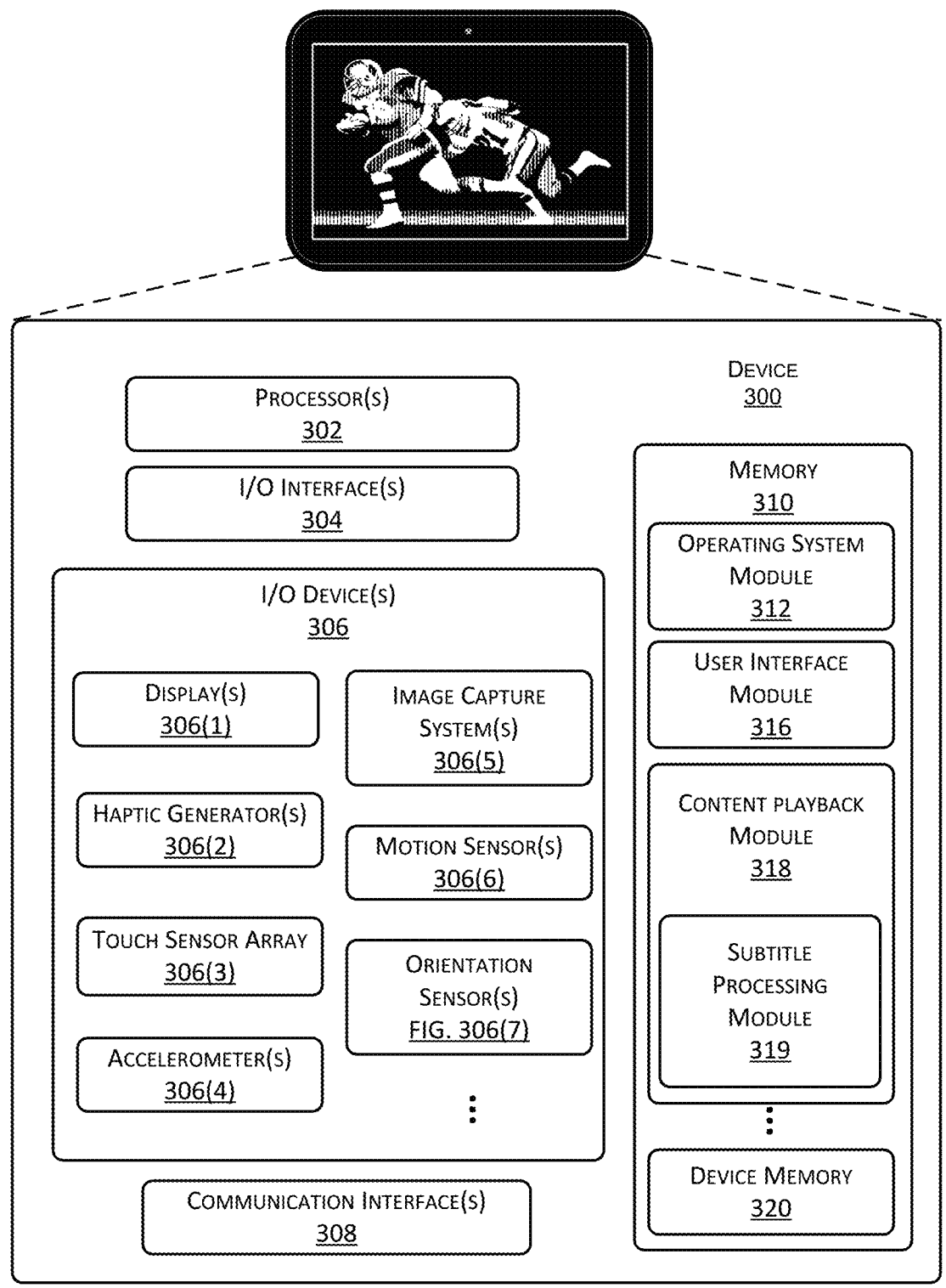
FIG. 3 is an example of a client device with which implementations enabled by the present disclosure may be practiced.

A block diagram of an example of a client device 300 suitable for use with various implementations is shown in FIG. 3. As mentioned above, it should be understood that device 300 may be any of a wide variety of device types. Device 300 (depicted as a tablet device) includes one or more single or multi-core processors 302 configured to execute stored instructions (e.g., in device memory 320). Device 300 may also include one or more input/output (I/O) interface(s) 304 to allow the device to communicate with other devices. I/O interfaces 304 may include, for example, an inter-integrated circuit (I2C) interface, a serial peripheral interface (SPI) bus, a universal serial bus (USB), an RS-232 interface, a media device interface (e.g., an HDMI interface), and so forth. I/O interface(s) 304 is coupled to one or more I/O devices 306 which may or may not be integrated with client device 300.

Device 300 may also include one or more communication interfaces 308 configured to provide communications between the device and other devices. Such communication interface(s) 308 may be used to connect to cellular networks, personal area networks (PANs), local area networks (LANs), wide area networks (WANs), and so forth. For example, communications interfaces 308 may include radio frequency modules for a 3G or 4G cellular network, a WiFi LAN and a Bluetooth PAN. Device 300 also includes one or more buses or other internal communications hardware or software (not shown) that allow for the transfer of data and instructions between the various modules and components of the device.

Device 300 also includes one or more memories (e.g., memory 310). Memory 310 includes non-transitory computer-readable storage media that may be any of a wide variety of types of volatile and non-volatile storage media including, for example, electronic storage media, magnetic storage media, optical storage media, quantum storage media, mechanical storage media, and so forth. Memory 310 provides storage for computer readable instructions, data structures, program modules and other data for the operation of device 300. As used herein, the term "module" when used in connection with software or firmware functionality may refer to code or computer program instructions that are integrated to varying degrees with the code or computer program instructions of other such "modules." The distinct nature of the different modules described and depicted herein is used for explanatory purposes and should not be used to limit the scope of this disclosure.

Memory 310 includes at least one operating system (OS) module 312 configured to manage hardware resources such as I/O interfaces 304 and provide various services to applications or modules executing on processor(s) 302. Memory 310 also includes a user interface module 316, a content playback module 318, and other modules. Memory 310 also includes device memory 320 to store a wide variety of instructions and information using any of a variety of formats including, for example, flat files, databases, linked lists, trees, or other data structures. Such information includes content for rendering and display on display 306(1) including, for example, any type of video content. In some implementations, a portion of device memory 320 may be distributed across one or more other devices including servers, network attached storage devices, and so forth.

The client side logic used for requesting subtitle files in smaller chunks and/or handling subtitle files that have been broken into chunks (represented by subtitle processing module 319 in FIG. 3) may be implemented in a variety of ways, e.g., in hardware, software, and/or firmware. For example, at least some of this functionality may be implemented as part of the code of a media player operating on device 300. Alternatively, module 319 may be implemented separately from and interact with the device's media player, web browser, mobile app, decoder, etc.

In addition, implementations are contemplated in which at least a portion of the logic or computer program instructions may reside on a separate platform, e.g., service 202, CDN 214, etc.; potentially working in conjunction with the client-side logic to manage the chunks of a subtitle file. Suitable variations and alternatives will be apparent to those of skill in the art. It will also be understood that device 300 of FIG. 3 is merely an example of a device with which various implementations enabled by the present disclosure may be practiced, and that a wide variety of other devices types may also be used (e.g., devices 206-1 to 206-5). The scope of this disclosure should therefore not be limited by reference to device-specific details.

Figure 4:
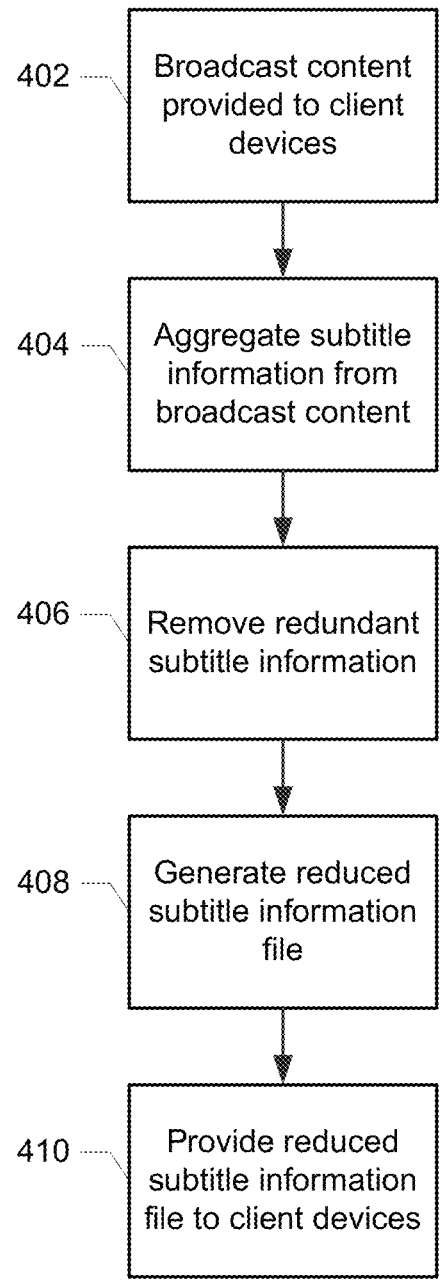
FIG. 4 is a flowchart illustrating operation of a particular class of implementations enabled by the present disclosure.

The delivery of content to a client device according to a particular implementation is illustrated in the flow chart of FIG. 4. It should be noted that this and other examples described herein may be employed with any of a variety of video and audio codecs including, for example, MPEG-1, MPEG-2, MPEG-4 Part 2, VC-1, H.263, VP8, VP9, Daala, H.264 (AVC), and H.265 (HEVC). Moreover, the basic principles described herein may be employed with any of a variety of streaming protocols by which client devices consume content including, for example, Apple's HTTP Live Streaming (HLS), Microsoft's Smooth Streaming, Adobe's HTTP Dynamic Streaming, Dynamic Adaptive Streaming over HTTP (DASH), etc.

Referring to FIG. 4, broadcast video content is generated and streamed to a population of client devices (402). As discussed above, the broadcast video content may depict a live event such as, for example, a professional sporting event or a concert. The video and audio components of such content may be captured using cameras and microphones and a variety of other technologies to generate various auditory and/or visual elements of the content, and then encoded and packaged for delivery to client devices. Alternatively, the broadcast content might not relate to a live event, but instead might include previously generated video content that is presented according to a schedule such as, for example, a premium movie channel. Regardless of the nature of the broadcast content, subtitle information is generated for packaging and delivery with the video and audio components of the content. As discussed above, the subtitle information may be delivered to the client devices consuming streams of the broadcast content as a sequence of subtitle fragments.

The subtitle information for the broadcast content is aggregated, e.g., as a single subtitle information file (404). This may be done while streaming of the broadcast content is ongoing. For example, a client process may be configured to establish a streaming session during which subtitle fragments of the broadcast content are requested and their corresponding text added as entries to the subtitle information file. This may be done in conjunction with capture of the video and audio components of the broadcast content for subsequent packaging and distribution as VOD-style content such as, for example, JAB content. Each of the subtitle entries includes a time range relative to the media timeline of the broadcast content (e.g., specified with beginning and ending time stamps).

The subtitle information file is then processed to remove redundant information (406). This may involve identification of a sequence of subtitle entries in the file that include redundant text and the removal of entries that are redundant relative to other entries. As discussed above with reference to the example of FIG. 1, the entry of file 102 including the phrase "#30 EXPLODED FOR 40 POINTS ON TUESDAY, LEADING HIS TEAM TO" includes all of the text of each of the preceding six entries, allowing for the "collapse" of the seven entries into one, e.g., the selection of the seventh entry for inclusion in the final set of entries to the exclusion of the other six. This might involve, for example, the sequential processing of entries to determine if any given entry is entirely contained in the following entry and, if so, eliminating the first entry. As will be appreciated by those of skill in the art, a variety of different approaches may be employed to identify such redundant information without departing from the scope of this disclosure.

A reduced subtitle information file is generated from the entries that remain after "collapse" of each of the identified sequences (408). The time range for the remaining entry of a given sequence of entries is modified to encompass all or some portion of the time range covered by the sequence of entries from which the remaining entry is derived. In the example of FIG. 1, the single entry in file 104 that results from the collapse of the seven entries of file 102 is shown as covering the entire time range of the seven entries, beginning at the time stamp of the first entry and ending at the time stamp of the seventh, i.e., the remaining entry would be displayed in the VOD-style content media timeline for that entire time range. However, this does not necessarily need to be the case.

For example, there are scenarios in which, if too much of the subtitle information is presented on the screen, some of the subtitle text might be presented earlier than the corresponding visual or audio content, potentially resulting in a "spoiler" effect, e.g., announcement of a touchdown might precede the football crossing the goal line. Therefore, according to various implementations, constraints may be placed on the time range for a subtitle entry, and/or on the identification and/or selection of subtitle entries for inclusion or deletion.

In one example of such a constraint, a limit may be placed on how many subtitle entries may be collapsed into a single entry. This might be achieved, for example, by comparing the time range for a given sequence of subtitle entries to a programmable threshold representing a maximum allowable time range over which entries may be collapsed, e.g., about 3-5 seconds. If the sequence of entries covers a time range that is longer than the allowable duration, collapsing of all of the entries to one entry would not be allowed. This would make it less likely that subtitle text would appear well before the corresponding video or audio content it represents.

In another example of a constraint, the time range associated with a remaining entry might be less than the time range associated with the sequence of entries from which the remaining entry is derived. This might be achieved, for example, by delaying presentation of the entry by some programmable amount (e.g., about 0.5-1 second). In the example of FIG. 1, this might be done by specifying the beginning time stamp of the entry of file 104 to be later than the beginning time stamp of the first entry of file 102, e.g., "00:00:03.464" rather than "00:00:02.964."

In another example of a constraint, collapse of a sequence of entries would not be allowed if the sequence of entries includes a relatively long time period(s) during which new subtitle text is not introduced. Such a period might represent an extended duration during which no one is speaking. This might be achieved, for example, by detecting one or more gaps in a sequence of entries (e.g., as represented by gaps in time stamps of consecutive entries) and comparing the duration of any such gap(s) to a programmable threshold (e.g., about 5 or 10 seconds). This would reduce the likelihood, for example, that unrelated subtitle text would be collapsed and/or presented together.

Referring back to FIG. 4, the reduced subtitle information file that results from processing of the aggregated subtitle information of the broadcast content may then be provided to client devices in conjunction with the delivery of the captured video and audio components of the broadcast content as VOD-style content such as, for example, JAB content (410). For example, after completion of a live event represented by the broadcast content, the captured video and audio components and the reduced subtitle information file may be packaged for on-demand delivery in which the reduced subtitle information file is transmitted in its entirety to clients (e.g., Smooth Streaming clients) in connection with downloading of the video content. Alternatively, the information from the subtitle information file may be integrated with the media fragments delivered to clients (e.g., HLS or DASH clients). And while the reduction in the size of the subtitle file enabled by the present disclosure may be beneficial for any client device, it may be particularly useful for some so-called "living room devices" that have limited memory and/or processing resources and so aren't able to handle large subtitle files.

Implementations are also contemplated in which a subtitle information file, whether or not reduced as described herein, may be provided to client devices as a collection of smaller portions or "chunks" derived from the original set of subtitle information. That is, given the size of a subtitle information file, it may be advantageous to deliver the file (reduced or not) as a series of smaller chunks to client devices that can support such delivery. Two variants of this general idea include (1) client-side chunking in which client devices requests smaller portions of a contiguous subtitle information file, and (2) server-side chunking in which the subtitle information file is partitioned into smaller portions by a service or process at the back end.

Client-side chunking may be implemented by, for example, including code on a client device (e.g., as part of a media player or as a separate module) that is configured to request chunks of a remotely stored and contiguous subtitle information file in substantially equivalent chunks (e.g., about 50k-100k). This may be done, for example, using byte-range requests (e.g., HTTP range requests), time-range requests (that may be converted to byte-range requests at the server side), or other types of requests for part of a remote object or file (e.g., an XMLHttpRequest). And it may be important for such implementations to ensure that such requests do not specify a range of data that crosses boundaries, e.g., individual character boundaries, subtitle line boundaries, subtitle entry boundaries, etc. For example, if the size of each subtitle character is uniform and known, each request boundary might be based on an integer multiple of that character size.

Server-side chunking involves the partitioning of the aggregated subtitle information into a number of smaller files, e.g., individual files that each cover about 20 or 30 seconds of subtitle information. The client devices would be configured to request these files one at a time and in succession. According to some implementations, such a series of client requests can be supported with little or no modification to client-side logic using, for example, VOD-style manifests that enable the client device to generate properly formatted requests for each of the server-side chunks in succession.

While the subject matter of this application has been particularly shown and described with reference to specific implementations thereof, it will be understood by those skilled in the art that changes in the form and details of the disclosed implementations may be made without departing from the spirit or scope of the invention. Examples of some of these implementations are illustrated in the accompanying drawings, and specific details are set forth in order to provide a thorough understanding thereof. It should be noted that implementations may be practiced without some or all of these specific details. In addition, well known features may not have been described in detail to promote clarity. Finally, although various advantages have been discussed herein with reference to various implementations, it will be understood that the scope of the invention should not be limited by reference to such advantages. Rather, the scope of the invention should be determined with reference to the appended claims.

What is claimed is:

1. A computer-implemented method, comprising:
capturing video content and audio content, the video content and audio content being associated with a live event;
generating subtitle information representing the audio content, the subtitle information including a plurality of subtitle entries including subtitle text originating from a single source, each of the subtitle entries having an associated specified time range during which the corresponding subtitle entry is to be presented in conjunction with the video and audio content, a first subset of the subtitle entries having consecutive specified time ranges covering a combined time range, each of the subtitle entries of the first subset including subtitle text that corresponds to all or a portion of a specific phrase;
packaging the video content, the audio content, and the subtitle information as broadcast content;
providing the broadcast content as a content stream to a first client device, including providing the subtitle information to the first client device as a sequence of separate subtitle fragments;
aggregating the subtitle information into a single subtitle information file;
after completion of the live event, packaging the video content, the audio content, and the subtitle information for delivery as on-demand content, including processing the subtitle information file to remove one or more of the first subset of subtitle entries thereby generating a reduced subtitle information file, the reduced subtitle information file including a remaining subtitle entry of the first subset of subtitle entries, the subtitle text of the remaining subtitle entry including the specific phrase;
generating a modified time range for the remaining subtitle entry, the modified time range covering a portion of the combined time range that is larger than the specified time range associated with the remaining subtitle entry;
packaging the video content, the audio content, and the reduced subtitle information file for delivery as on-demand content associated with the live event; and
providing the on-demand content to a second client device, including providing the reduced subtitle information file to the second client device.

2. The method of claim 1, further comprising providing the reduced subtitle information file to the second client device as a plurality of file chunks in response to a sequence of requests from the second client device corresponding to the file chunks.

3. The method of claim 1, further comprising dividing the reduced subtitle information file into a plurality of distinct subtitle information files.

4. The method of claim 1, wherein the broadcast content and the on-demand content share a common media timeline, and wherein processing the subtitle information file includes manipulating timing information associated with one or more of the subtitle entries included in the subtitle information to delay presentation of corresponding subtitle text on the media timeline in conjunction with presentation of the on-demand content relative to presentation of the corresponding subtitle text on the media timeline in conjunction with presentation of the broadcast content.

5. A computer-implemented method, comprising:
obtaining subtitle information associated with broadcast content, the subtitle information including a plurality of subtitle entries including subtitle text, each of the subtitle entries having an associated specified time range during which the corresponding subtitle entry is to be presented in conjunction with the broadcast content, a first subset of the subtitle entries having consecutive specified time ranges covering a combined time range, each of the subtitle entries of the first subset including subtitle text that corresponds to all or a portion of a specific phrase;
processing the subtitle information to remove one or more of the first subset of subtitle entries thereby generating reduced subtitle information, the reduced subtitle information including a remaining subtitle entry of the first subset of subtitle entries, the subtitle text of the remaining subtitle entry including the specific phrase;
generating a modified time range for the remaining subtitle entry, the modified time range covering a portion of the combined time range that is larger than the specified time range associated with the remaining subtitle entry; and
providing the reduced subtitle information to a client device for presentation with on-demand content derived from the broadcast content.

6. The method of claim 5, further comprising aggregating the subtitle information from a sequence of subtitle fragments associated with the broadcast content as the plurality of subtitle entries.

7. The method of claim 6, wherein aggregation of the subtitle information occurs while transmission of the broadcast content is ongoing.

8. The method of claim 6, wherein processing the subtitle information includes:
identifying the first subset of subtitle entries; and
selecting the remaining subtitle entry for inclusion in the reduced subtitle information.

9. The method of claim 8, wherein the modified time range is shorter and begins later than the combined time range.

10. The method of claim 8, wherein identifying the first subset of subtitle entries includes determining that the combined time range is not longer than a time range threshold.

11. The method of claim 8, wherein identifying the first subset of subtitle entries includes determining that the first subset of subtitle entries does not include an inactive time range without addition of new subtitle text that is longer than a time range threshold.

12. The method of claim 5, further comprising providing the reduced subtitle information to the client device as a plurality of file chunks in response to a sequence of requests from the client device corresponding to the file chunks.

13. The method of claim 5, further comprising dividing the reduced subtitle information into a plurality of distinct subtitle information files.

14. A computer program product, comprising one or more non-transitory computer-readable media having computer program instructions stored therein, the computer program instructions being configured such that, when executed by one or more computing devices, the computer program instructions cause the one or more computing devices to:
obtain subtitle information associated with broadcast content, the subtitle information including a plurality of subtitle entries including subtitle text, each of the subtitle entries having an associated specified time range during which the corresponding subtitle entry is to be presented in conjunction with the broadcast content, a first subset of the subtitle entries having consecutive specified time ranges covering a combined time range, each of the subtitle entries of the first subset including subtitle text that corresponds to all or a portion of a specific phrase;
process the subtitle information to remove one or more of the first subset of subtitle entries thereby generating reduced subtitle information, the reduced subtitle information including a remaining subtitle entry of the first subset of subtitle entries, the subtitle text of the remaining subtitle entry including the specific phrase;
generate a modified time range for the remaining subtitle entry, the modified time range covering a portion of the combined time range that is larger than the specified time range associated with the remaining subtitle entry; and
provide the reduced subtitle information to a client device for presentation with on-demand content derived from the broadcast content.

15. The computer program product of claim 14, wherein the computer program instructions are further configured to cause the one or more computing devices to aggregate the subtitle information from a sequence of subtitle fragments associated with the broadcast content as the plurality of subtitle entries.

16. The computer program product of claim 15, wherein the computer program instructions are configured to cause the one or more computing devices to aggregate the subtitle information while transmission of the broadcast content is ongoing.

17. The computer program product of claim 15, wherein the computer program instructions are configured to cause the one or more computing devices to process the subtitle information by:
identifying the first subset of subtitle entries; and
selecting the remaining subtitle entry for inclusion in the reduced subtitle information.

18. The computer program product of claim 17, wherein the modified time range is shorter and begins later than the combined time range.

19. The computer program product of claim 17, wherein the computer program instructions are configured to cause the one or more computing devices to identify the first subset of subtitle entries by determining that the combined time range is not longer than a time range threshold.

20. The computer program product of claim 17, wherein the computer program instructions are configured to cause the one or more computing devices to identify the first subset of subtitle entries by determining that the first subset of subtitle entries does not include an inactive time range without addition of new subtitle text that is longer than a time range threshold.

21. The method of claim 5, wherein the subtitle text of the plurality of subtitle entries originates from a single source.

22. The computer program product of claim 14, wherein the subtitle text of the plurality of subtitle entries originates from a single source.

\* \* \* \* \*